US008752851B2

(12) United States Patent
Chen

(10) Patent No.: US 8,752,851 B2
(45) Date of Patent: Jun. 17, 2014

(54) AUXILIARY DEVICE FOR BICYCLE

(76) Inventor: Shia-Lin Chen, Hsinchu (TW)

( * ) Notice: Subject to any disclaimer, the term of this patent is extended or adjusted under 35 U.S.C. 154(b) by 319 days.

(21) Appl. No.: 13/397,674

(22) Filed: Feb. 15, 2012

(65) Prior Publication Data

US 2013/0025383 A1      Jan. 31, 2013

(30) Foreign Application Priority Data

| Jul. 25, 2011 | (TW) | 100213644 U |
| Aug. 26, 2011 | (TW) | 100215975 U |
| Sep. 9, 2011 | (TW) | 100216973 U |

(51) Int. Cl.
*F16H 21/34* (2006.01)

(52) U.S. Cl.
USPC ............................................. 280/230; 74/43

(58) Field of Classification Search
USPC ........ 280/7.15, 214, 220, 221, 223, 230, 233, 280/247, 256, 294, 296; 482/57; 74/43
See application file for complete search history.

(56) References Cited

U.S. PATENT DOCUMENTS

| 1,981,737 | A | * | 11/1934 | McIlwain | 280/223 |
| 3,132,877 | A | * | 5/1964 | Pontin | 280/257 |
| 4,443,024 | A | * | 4/1984 | Okai | 280/304 |
| 4,867,441 | A | * | 9/1989 | Blakeman | 482/57 |
| 4,909,526 | A | * | 3/1990 | Vazin | 280/230 |
| 5,002,298 | A | * | 3/1991 | Motto | 280/233 |
| 5,172,926 | A | * | 12/1992 | Mannino | 280/252 |
| 5,501,476 | A | * | 3/1996 | Howell et al. | 280/230 |
| 5,511,810 | A | * | 4/1996 | Tong | 280/233 |
| 5,768,702 | A | * | 6/1998 | Kim | 2/1 |
| 5,848,955 | A | * | 12/1998 | Gooch et al. | 482/57 |
| 6,142,562 | A | * | 11/2000 | Varan | 297/201 |
| 6,179,760 | B1 | * | 1/2001 | Rumbaugh | 482/121 |
| 6,357,825 | B1 | * | 3/2002 | Bavaresco | 297/201 |
| 6,368,256 | B1 | * | 4/2002 | Rumbaugh | 482/121 |
| 6,688,623 | B1 | * | 2/2004 | Yunaska | 280/233 |
| 6,738,987 | B1 | * | 5/2004 | Parks | 2/312 |
| 7,540,830 | B2 | * | 6/2009 | Hildebrandt et al. | 482/57 |
| 8,569,901 | B2 | * | 10/2013 | Chen | 290/1 R |
| 2002/0074767 | A1 | * | 6/2002 | Wielkopolski | 280/259 |
| 2007/0182224 | A1 | * | 8/2007 | Jansch | 297/214 |
| 2007/0255191 | A1 | * | 11/2007 | Cozzo et al. | 602/23 |
| 2011/0095505 | A1 | * | 4/2011 | Heath | 280/210 |
| 2012/0329611 | A1 | * | 12/2012 | Bouchard et al. | 482/57 |
| 2013/0025383 | A1 | * | 1/2013 | Chen | 74/43 |
| 2013/0049374 | A1 | * | 2/2013 | Chen | 290/1 R |

* cited by examiner

*Primary Examiner* — Katy M Ebner
*Assistant Examiner* — Brodie Follman
(74) *Attorney, Agent, or Firm* — Cheng-Ju Chiang

(57) ABSTRACT

An auxiliary device for a bicycle is disclosed. The auxiliary device includes a pair of thrusting members and a drive mechanism pivotally coupled between the thrusting members and the bicycle. The thrusting members positioned at two sides of the bicycle in a one-up-one-down manner, so that the thrusting members normally abut against a cyclist's back thigh muscles. The drive mechanism has two first pivots, a second pivot and a linkage system so as to make the thrusting members thrust the cyclist's back thigh muscles when the cyclist treadles the treadles. Thereby, the auxiliary device is useful to reduce burden bore by the cyclist's front thigh muscles and shank muscles, and can use the kinetic energy generated by the cyclist's back thigh muscles to enhance the cyclist's riding speed and endurance.

9 Claims, 6 Drawing Sheets

AUXILIARY DEVICE FOR BICYCLE

BACKGROUND OF THE INVENTION

1. Field of the Invention

The present invention relates to auxiliary devices for bicycles, and more particularly to an auxiliary device that thrusts and is thus driven by a cyclist's back thighs to assists in driving treadles when the cyclist rides the bicycle, wherein the auxiliary device moves synchronously with the cyclist's downward moving thighs and shanks, so as to reduce burden bore by the cyclist's front thigh muscles and shank muscles, thereby facilitating progression.

2. Related Art

Bicycles are popular for being not only a transportation means but also an exercise tool. A cyclist rides a bicycle forward by exerting downward force on treadles of the bicycle to drive wheels through the bicycle's chain. During such riding, the cyclist has his/her front thigh muscles (quadriceps) and shank muscles exercised most, and fatigue accumulated in these muscles over time tends to deteriorate the cyclist's riding endurance and speed.

It is well known that thigh muscles are the most sinewy muscles in human bodies. With this understanding, the present inventor believes that by thrusting a cyclist's back thigh muscles when the cyclist treadles a bicycle's treadles, the fatigue otherwise accumulated in the cyclist's front thigh muscles and shank muscles can be reduced, and force exerted by the downward moving thighs can be used as additional motive power.

SUMMARY OF THE INVENTION

The primary objective of the present invention is to provide an auxiliary device for a bicycle. The auxiliary device is able to give pressure to a cyclist's back thigh muscles when the cyclist treadles the bicycle's treadles, so as to reduce burden bore by the cyclist's back thigh muscles and shank muscles, and is able to synchronously enhance progression when the cyclist's thighs and shanks exert downward force, thereby reducing fatigue accumulated in the cyclist's muscles and in turn enhancing the cyclist's riding speed and endurance.

To achieve this and other objectives, the auxiliary device of the present invention is characterized in having a pair of thrusting members and a drive mechanism pivotally coupled between the thrusting members and a bicycle it is assembled to so that the thrusting members normally abut against a cyclist's back thigh muscles. The drive mechanism has two first pivots, a second pivot and a linkage system so as to make the thrusting members thrust the cyclist's back thigh muscles when the cyclist treadles the treadles. Thereby, the auxiliary device is useful to reduce burden bore by the cyclist's front thigh muscles and shank muscles, and can use the kinetic energy generated by the cyclist's back thigh muscles to enhance the cyclist's riding speed and endurance.

According to the above-mentioned main feature, the linkage system is a three-link system that for each said thrusting member provides a first bearing rod, a second bearing rod and a third bearing rod, in which the first bearing rod has one end pivotally coupled with the first pivot and an opposite end pivotally coupled with one end of a shaft of the treadle close to the crank, and the second bearing rod also has one end pivotally coupled with the first pivot and an opposite end pivotally coupled with the second pivot, while the third bearing rod also has one end pivotally coupled with the first pivot and an opposite end pivotally coupled with the thrusting member.

Another feature of the disclosed auxiliary device is that the drive mechanism further comprises a transmission shaft and two bevel gears, in which each of the bevel gears is arranged between the second pivot and the freewheel axle, while the first pivots and the second pivot are pivotally coupled with the linkage system, respectively.

According to the above-mentioned main feature, the linkage system may alternatively be a two-link system that for each said thrusting member provides a first bearing rod and a second bearing rod, in which the first bearing rod has two ends thereof pivotally coupled with the first and second pivot, respectively, and the second bearing rod has one end pivotally coupled with the first pivot and an opposite end pivotally coupled with the thrusting member.

Still another feature of the disclosed auxiliary device is that the drive mechanism further comprises a transmission shaft and two bevel gears, in which each of the bevel gears is arranged between one said second pivot and a rear transmission shaft of the bicycle, while the first pivots and the second pivots are pivotally coupled with the linkage system, respectively.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DESCRIPTION OF THE PREFERRED EMBODIMENTS

Figure 1:
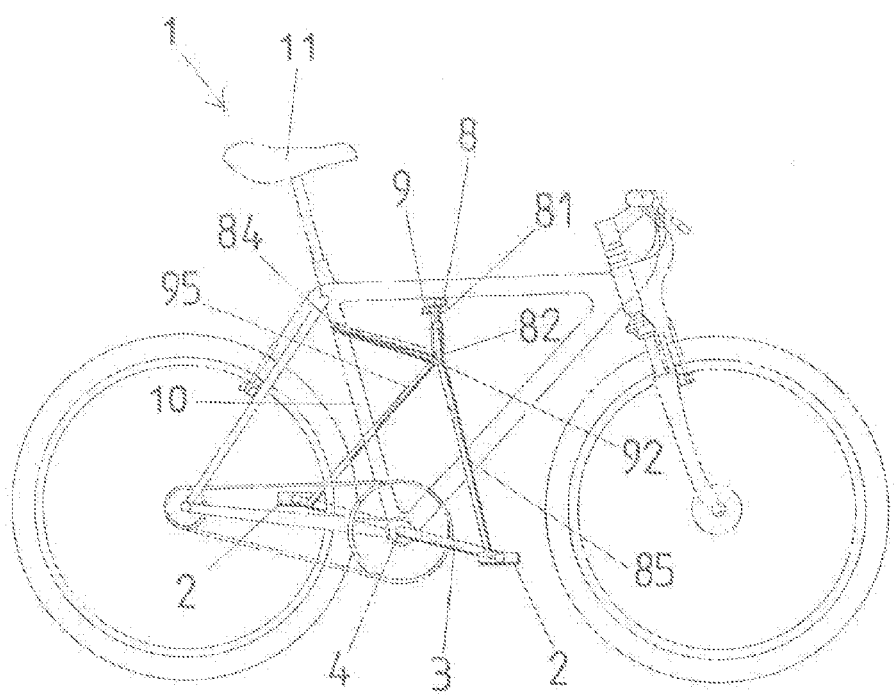
FIG. 1 shows an auxiliary device according to a first embodiment of the present invention, wherein the auxiliary device is assembled to a bicycle.
Figures 2, 3:
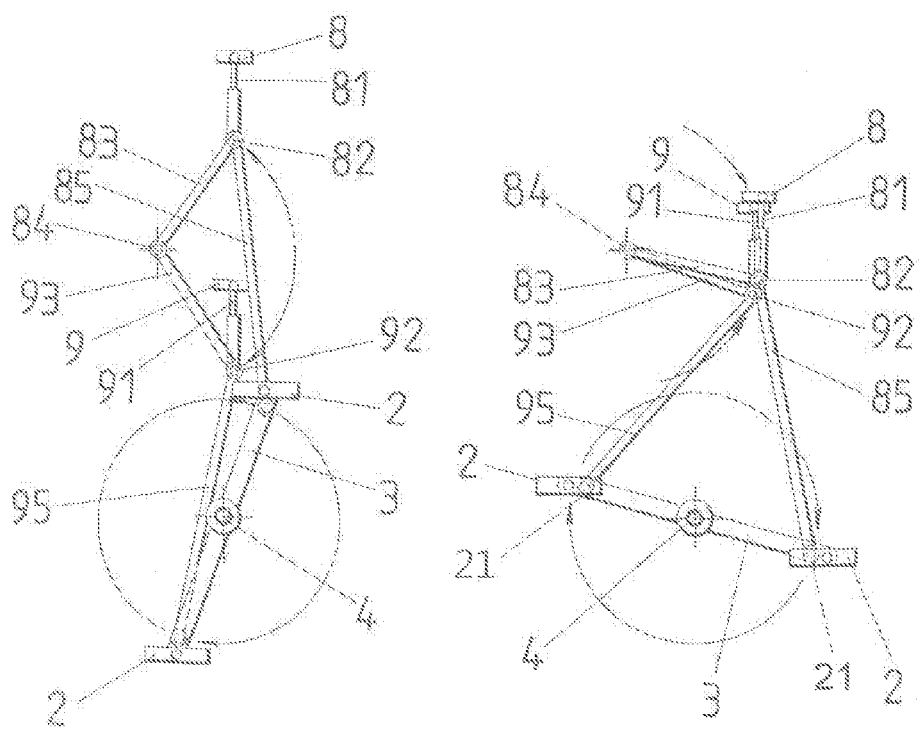
FIGS. 2 and 3 are schematic drawings illustrating operation of the auxiliary device of FIG. 1.
Figure 4:
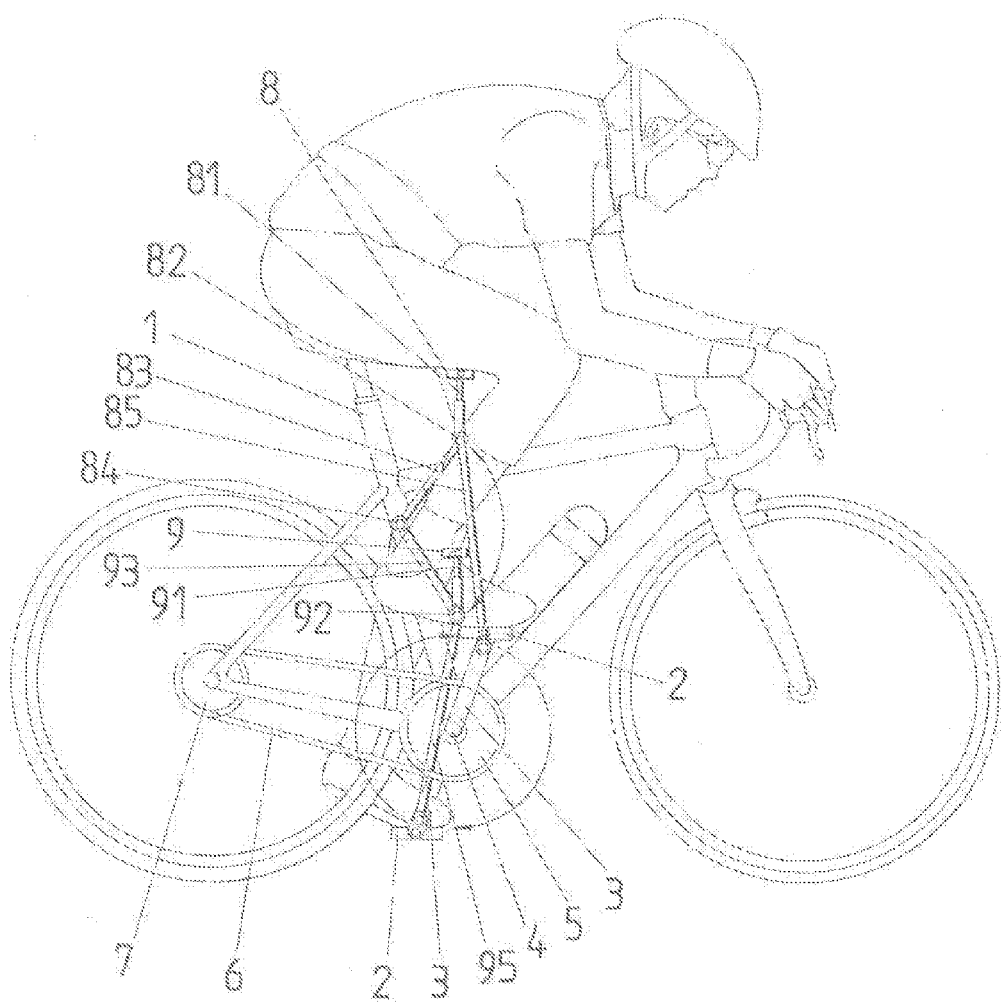
FIG. 4 is an applied view of the auxiliary device of FIG. 1, showing one of paired thrusting members thrusting a cyclist's thigh.
Figure 5:
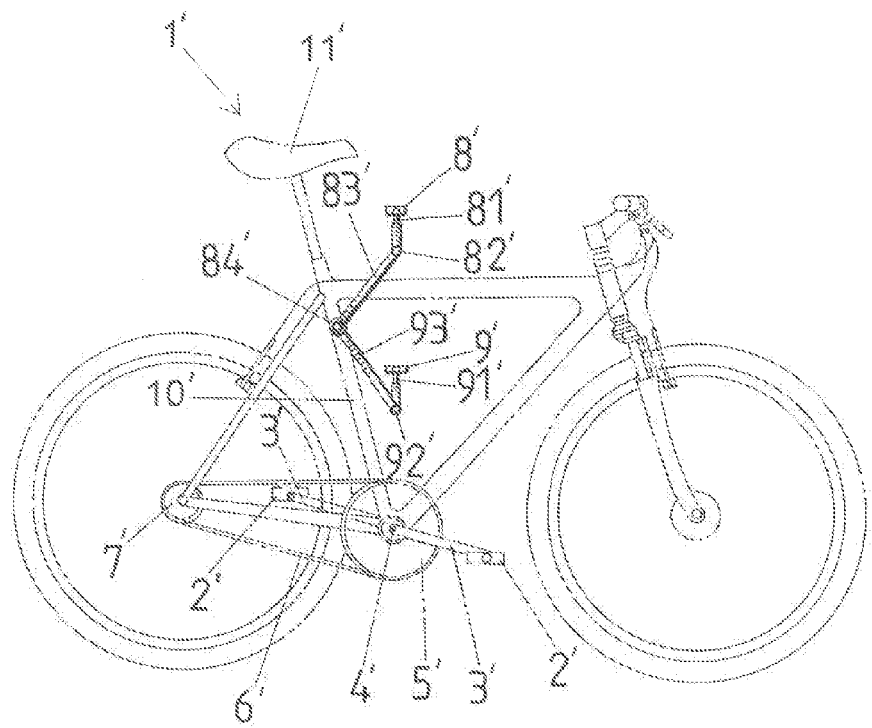
FIG. 5 shows an auxiliary device according to a second embodiment of the present invention, wherein the auxiliary device is assembled to a bicycle.
Figures 6, 7:
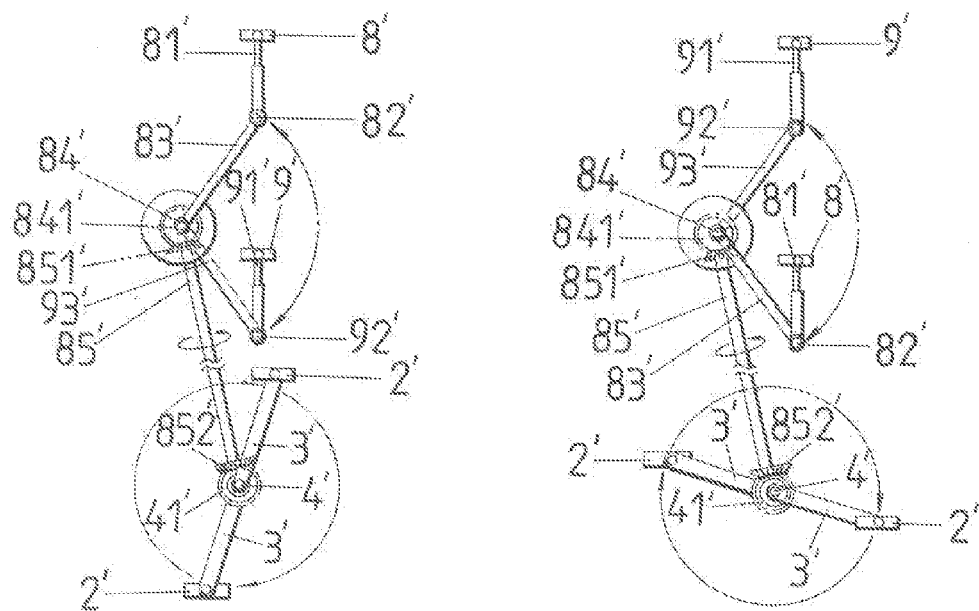
FIGS. 6 and 7 are schematic drawings illustrating operation of the auxiliary device of FIG. 5.
Figure 8:
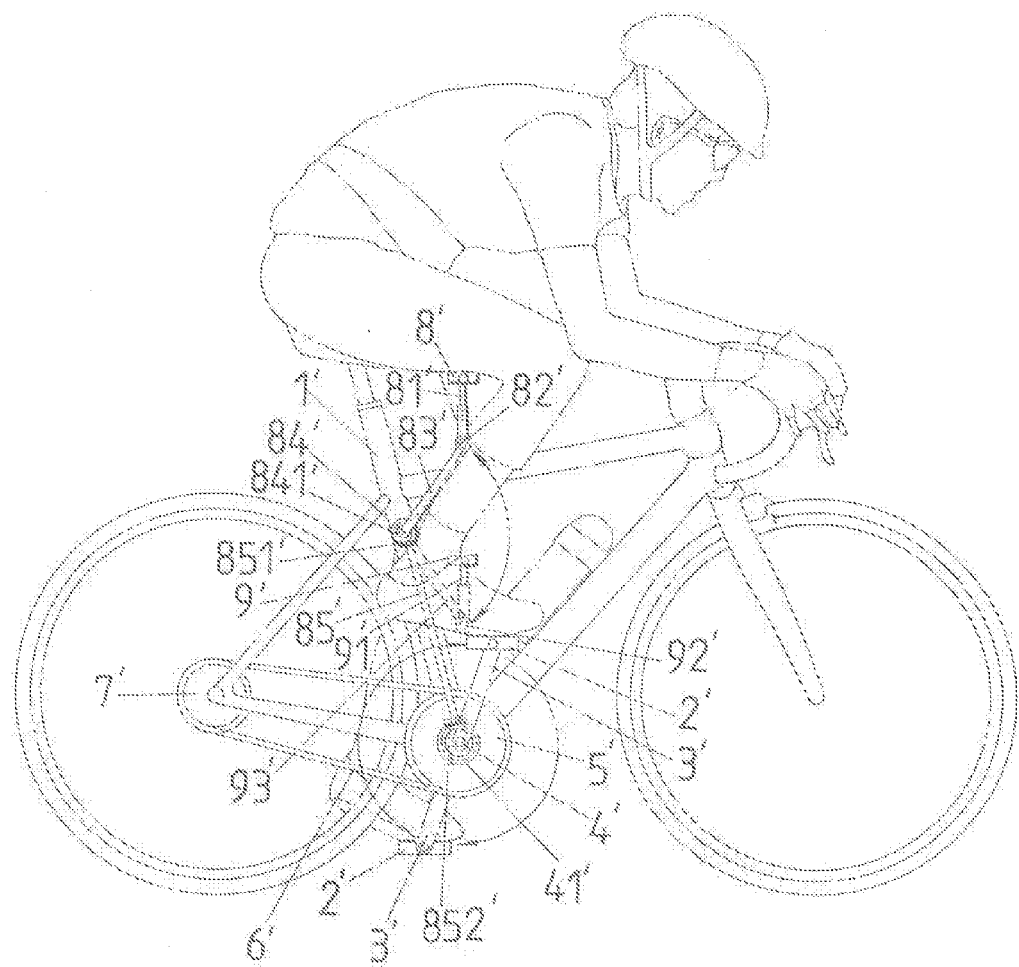
FIG. 8 is an applied view of the auxiliary device of FIG. 5, showing one of paired thrusting members thrusting a cyclist's thigh.
Figure 9:
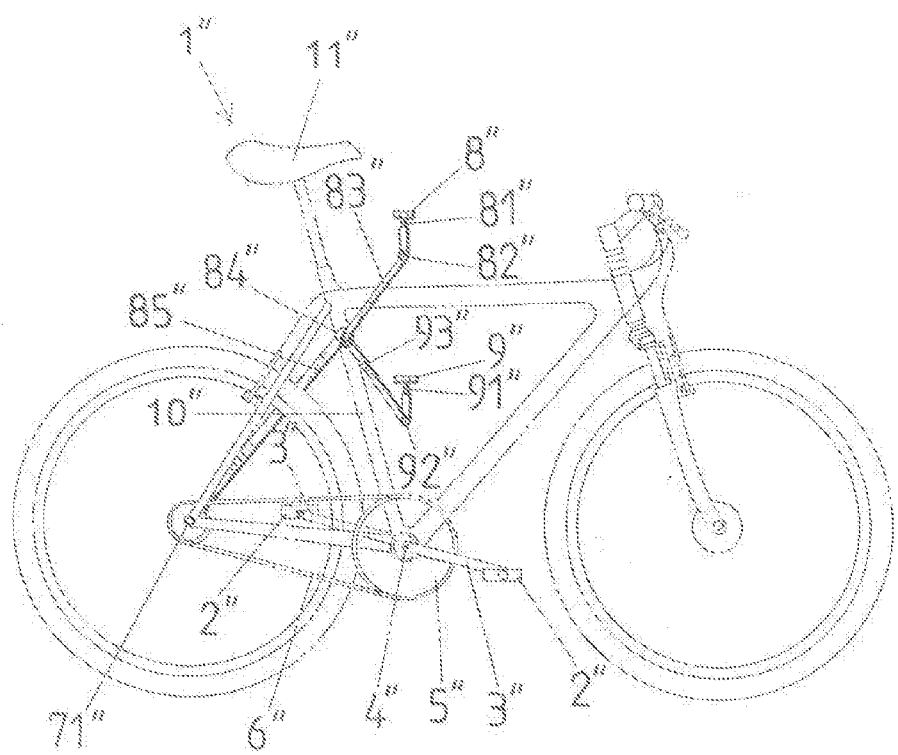
FIG. 9 shows an auxiliary device according to a third embodiment of the present invention, wherein the auxiliary device is assembled to a bicycle.
Figures 10, 11:
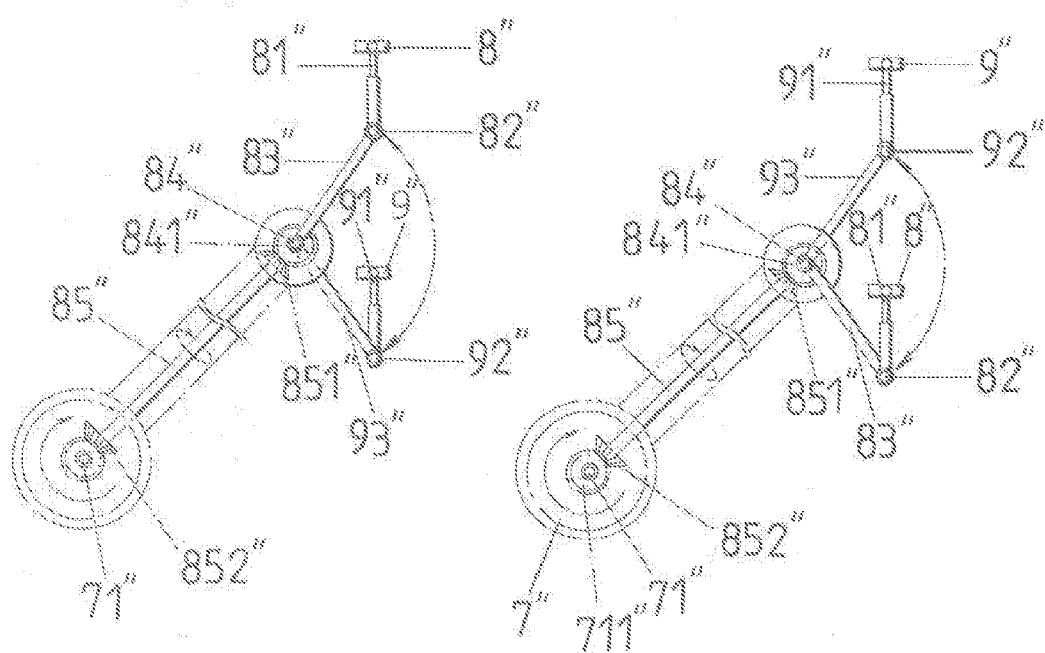
FIGS. 10 and 11 are schematic drawings illustrating operation of the auxiliary device of FIG. 9.
Figure 12:
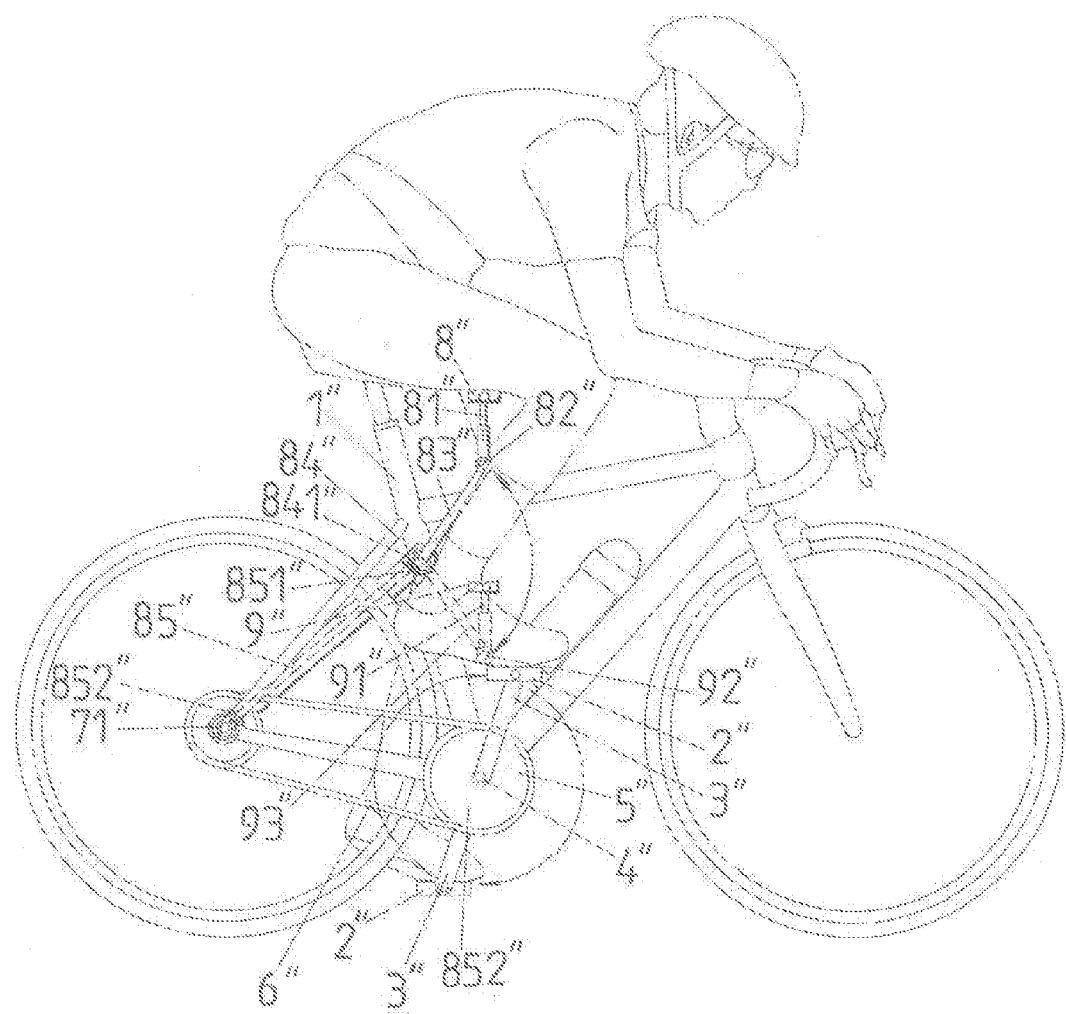
FIG. 12 is an applied view of the auxiliary device of FIG. 9, showing one of paired thrusting members thrusting a cyclist's thigh.

Please refer to FIGS. 1 through 4 for a first embodiment of the auxiliary device of the present invention. As shown in FIG. 1, the disclosed auxiliary device is configured to be assembled to a normal bicycle (or to a tricycle or to other foot-driven devices, such as exercise tools and the like). The normal bicycle typically comprises: a bicycle frame 10, two treadles 2, two cranks 3, a freewheel axle 4, a chain wheel 5, a chain 6, and a rear-wheel axle 7, among others. As shown, the disclosed auxiliary device comprises: a pair of thrusting members 8, 9 and a drive mechanism that is pivotally coupled between the thrusting members and the bicycle 1. The thrusting members 8 and 9 are positioned at two sides of the bicycle frame 10 near a seat 11 of the bicycle 1 in a one-up-one-down manner. The thrusting members 8 and 9 are made of a material comfortable to a cyclist's thighs, and are shaped and sized to fittingly wrap part of the thighs, so as to facilitate the cyclist's exerting force and riding.

The drive mechanism is pivotally coupled between the thrusting members 8 and 9 and the bicycle 1. In the first embodiment, the drive mechanism comprises two first pivots 82 and 92, a second pivot 84, two first bearing rods 85 and 95, two second bearing rods 83 and 93 and two third bearing rods 81 and 91. The first bearing rod 85 or 95 has one end pivotally coupled with the corresponding first pivot 82 or 92 and an opposite end pivotally coupled with one end of a shaft 21 of the corresponding treadle 2 near the crank 3. The second bearing rod 83 or 93 also has one end pivotally coupled with the corresponding first pivot 82 or 92 and an opposite end pivotally coupled with the second pivot 84. The third bearing rod 81 or 91 also has one end pivotally coupled with the corresponding first pivot 82 or 92 and an opposite end pivotally coupled with the corresponding thrusting member 8 or 9. It is to be noted that a summed length of the first bearing rod 85 or 95 and the second bearing rod 83 or 93 is greater than a distance between the second pivot 84 and any of the treadles 2. Thereby, the first bearing rod 85 or 95 and the second bearing rod 83 or 93 can keep moving synchronously with the treadle 2. In other words, when the treadle 2 performs circular motion, the corresponding first bearing rod 85 or 95 and the second bearing rod 83 or 93 can move up and down with it.

In addition to the foregoing configuration, an adjusting means may be provided between the thrusting members 8 and 9 and the drive mechanism, making the thrusting members adjustable in direction and height. In the present embodiment, the third bearing rods 81 and 91 are adjustable in length, height and angle while the first bearing rods 85 and 95 and the second bearing rods 83 and 93 are adjustable in length, so that the thrusting members can be positioned at any point between a center of the cyclist's thigh and the cyclist's hip or knee back, so as to be adaptive to the cyclist of any habitus.

With the foregoing configuration, when the cyclist sits on the bicycle, his/her back thigh muscles are pressed by the thrusting members 8 and 9, and when he/she treadles the treadles 2, the first bearing rods 85 and 95, the second bearing rods 83 and 93 and the third bearing rods 81 and 91, in response to the downward pressing force from the cyclist's thighs and shanks, jointly make the thrusting members 8 and 9 move up or down synchronously, so as to reduce burden bore by the cyclist's back thigh muscles and shank muscles, and enhance the cyclist's riding speed and endurance.

Now please refer to FIGS. 5 through 8 for a second embodiment of the disclosed auxiliary device. In the present embodiment, the auxiliary device is also to be assembled to a normal bicycle that includes a bicycle frame 10', two treadles 2', two cranks 3', a freewheel axle 4', a chain wheel 5', a chain 6', and a rear-wheel axle 7'. The auxiliary device similarly has a pair of thrusting members 8' and 9' and a drive mechanism pivotally coupled between the thrusting members and the bicycle 1'. Therein, the thrusting members 8' and 9', as shown, are positioned at two sides of the bicycle frame 10' near a seat 11' of the bicycle 1' in a one-up-one-down manner.

The drive mechanism comprises two first pivots 82' and 92' and a second pivot 84', and further comprises a transmission shaft 85' and two bevel gears 851', 852', and two first bearing rods 83', 93', and two second bearing rods 81', 91'. Therein, the transmission shaft 85' is assembled inside the bicycle frame 10', and the two bevel gears 851' and 852' are assembled to an end of the second pivot 84' and an end of the freewheel axle 4', respectively. The first pivots 82' and 92' and the second pivot 84' are pivotally coupled with the first bearing rods 83' and 93' and the second bearing rods 81' and 91', respectively. Each said first bearing rod 83' or 93' has its two ends pivotally coupled with the corresponding first pivot 82' or 92' and the second pivot 84', respectively. Each said second bearing rod 81' or 91' has one end pivotally coupled with the corresponding first pivot 82' or 92' and an opposite end pivotally coupled with the corresponding thrusting member 8' or 9'.

With the foregoing configuration, when the cyclist sits on the bicycle, his/her back thigh muscles are pressed by the thrusting members 8' and 9', and when he/she treadles the treadles 2', the first bearing rods 83' and 93', the second bearing rods 81' and 91', the transmission shaft 85' and the bevel gears 851' and 852', in response to the downward pressing force from the cyclist's thighs and shanks, jointly make the thrusting members 8' and 9' move up or down synchronously, so as to reduce burden bore by the cyclist's back thigh muscles and shank muscles, and enhance the cyclist's riding speed and endurance.

Now please refer to FIGS. 9 through 12 for a third embodiment of the disclosed auxiliary device. In the present embodiment, the auxiliary device is also to be assembled to a normal bicycle that includes a bicycle frame 10", two treadle 2", two cranks 3", a freewheel axle 4", a chain wheel 5", a chain 6", and a rear-wheel axle 7". The auxiliary device also comprises a pair of thrusting members 8" and 9" and a drive mechanism pivotally coupled between the thrusting members and bicycle 1. Therein, the thrusting members 8" and 9", as shown, are positioned at two sides of the bicycle frame 10" near a seat 11" of the bicycle 1" in a one-up-one-down manner.

The drive mechanism comprises two first pivots 82" and 92" and a second pivot 84", and further comprises a transmission shaft 85" and two bevel gears 851", 852", and two first bearing rods 83", 93", and two second bearing rods 81", 91". What makes the third embodiment different from the second embodiment is that the bevel gears 851" and 852" are arranged between the second pivot 84" and a rear transmission shaft 71" of the bicycle, respectively. Each said first pivot 82" or 92" and the second pivot 84" are pivotally coupled with the corresponding first bearing rod 83" or 93" and the corresponding second bearing rod 81" or 91", respectively. Each said first bearing rod 83" or 93" has its two ends pivotally coupled with the first pivot 82" or 92" and the second pivot 84", respectively. Each said second bearing rod 81" or 91" has one end pivotally coupled with the corresponding first pivot 82" or 92" and an opposite end pivotally coupled with the corresponding thrusting member 8" or 9".

With the foregoing configuration, when the cyclist sits on the bicycle, his/her back thigh muscles are pressed by the thrusting members 8" and 9", and when he/she treadles the treadles 2", the first bearing rods 83" and 93", the second bearing rods 81" and 91", the transmission shaft 85" and the bevel gears 851" and 852", in response to the downward pressing force from the cyclist's thighs and shanks, jointly make the thrusting members 8" and 9" move up or down synchronously, so as to reduce burden bore by the cyclist's back thigh muscles and shank muscles, and enhance the cyclist's riding speed and endurance.

What is claimed is:
1. An auxiliary device for a bicycle wherein the bicycle includes a bicycle frame, two treadles, two cranks, a freewheel axle, a chain wheel, a chain, a rear-wheel axle, and the auxiliary device comprises:

a pair of thrusting members positioned at two sides of the bicycle near a seat of the bicycle in a one-up-one-down manner; and a drive mechanism being pivotally coupled between the thrusting members and the bicycle and comprising: two first pivots, a second pivot and a linkage system, wherein the first pivots and the second pivot are pivotally coupled with the linkage system, respectively, and the linkage system has at least one end pivotally coupled with the first pivots and an opposite end pivotally coupled with components of the bicycle nearby travels of the cyclist's downward moving thighs and shanks;

whereby, when the cyclist has back thigh muscles thereof pressing the thrusting members and treadles of the bicycle, the linkage system in response to the downward pressing force from the cyclist's thighs and shanks makes the thrusting members move up or down synchronously, so as to reduce burden bore by the cyclist's back thigh muscles and shank muscles, and enhance the cyclist's riding speed and endurance.

2. The auxiliary device of claim 1, wherein the linkage system is a three-link system that for each said thrusting member provides a first bearing rod, a second bearing rod and a third bearing rod, in which the first bearing rod has one end pivotally coupled with the first pivot and an opposite end pivotally coupled with one end of a shaft of the treadle close to the crank, and the second bearing rod also has one end pivotally coupled with the first pivot and an opposite end pivotally coupled with the second pivot, while the third bearing rod also has one end pivotally coupled with the first pivot and an opposite end pivotally coupled with the thrusting member.

3. The auxiliary device of claim 1, wherein the drive mechanism further comprises a transmission shaft and two bevel gears, in which each of the bevel gears is arranged between the second pivot and the freewheel axle, while the first pivots and the second pivot are pivotally coupled with the linkage system, respectively.

4. The auxiliary device of claim 3, wherein the linkage system is a two-link system that for each said thrusting member provides a first bearing rod and a second bearing rod, in which the first bearing rod has two ends thereof pivotally coupled with the first and second pivot, respectively, and the second bearing rod has one end pivotally coupled with the first pivot and an opposite end pivotally coupled with the thrusting member.

5. The auxiliary device of claim 1, wherein the drive mechanism further comprises a transmission shaft and two bevel gears, in which each of the bevel gears is arranged between one said second pivot and a rear transmission shaft of the bicycle, while the first pivots and the second pivots are pivotally coupled with the linkage system, respectively.

6. The auxiliary device of claim 5, wherein the linkage system is a two-link system that for each said thrusting member provides a first bearing rod and a second bearing rod, in which the first bearing rod has two ends thereof pivotally coupled with the first and second pivots, respectively, and the second bearing rod has one end pivotally coupled with the first pivot and an opposite end pivotally coupled with the thrusting member.

7. The auxiliary device of claim 1, wherein a sum of a length of the first bearing rod and a length of the second bearing rod is greater than a distance between the second pivot and the treadle, whereby the first bearing rod and the second bearing rod keep moving synchronously with the treadle, meaning that when the treadle performs a circular motion, the first bearing rod and the second bearing rod keep moving up and down.

8. The auxiliary device of claim 1, wherein the thrusting members are made of a material comfortable to the cyclist's thighs, and are shaped and sized to fittingly wrap part of the thighs, so as to facilitate the cyclist's exerting force and riding.

9. The auxiliary device of claim 1, wherein the first bearing rod and the second bearing rod are adjustable in length, so as to position the thrusting member at any point between a center of the cyclist's thigh and the cyclist's hip or knee back, so as to be adaptive to the cyclist of any habitus.

* * * * *